Dec. 5, 1961 R. R. AMESBURY 3,011,809
KNOB ASSEMBLY
Filed Aug. 28, 1958
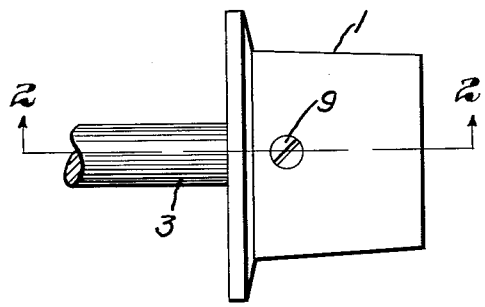
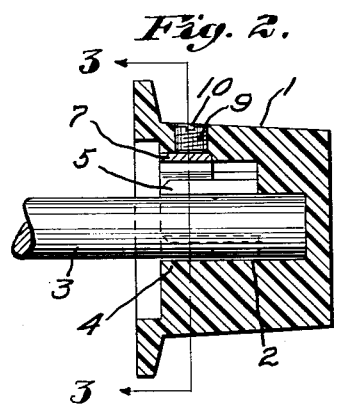
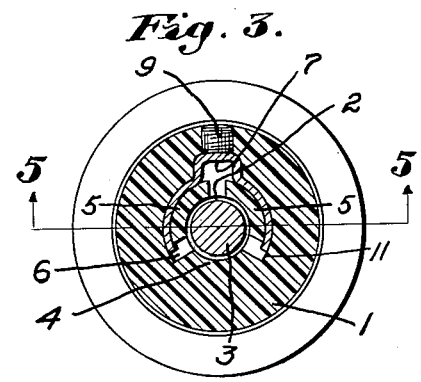
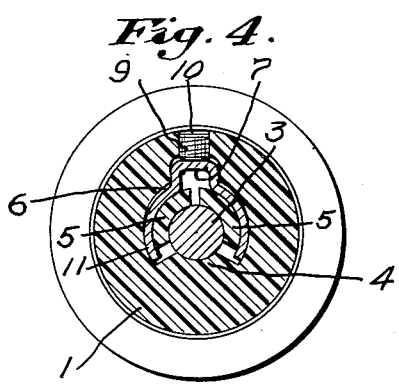
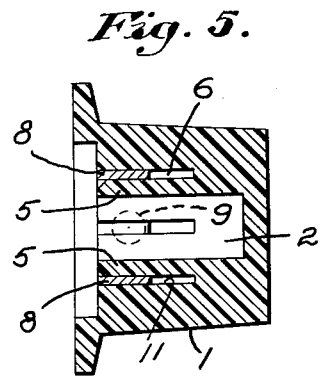
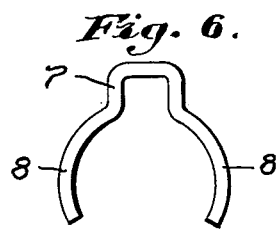
Inventor:
Robert R. Amesbury,
by Walter S. Jones
Att'y.

United States Patent Office 3,011,809
Patented Dec. 5, 1961

3,011,809
KNOB ASSEMBLY
Robert R. Amesbury, Wellesley, Mass., assignor to United-Carr Fastener Corporation, Cambridge, Mass., a corporation of Delaware
Filed Aug. 28, 1958, Ser. No. 757,727
2 Claims. (Cl. 287—53)

My invention aims to provide improvements in knob and shaft assemblies of the rotary operative or push, pull type.

An object of my invention is to provide a knob assembly that is simple, inexpensive and easy to assemble.

Another object of the invention is to provide a knob that may be assembled to a round shaft so that the shaft need not have a flat portion or any other odd shape.

In the drawings which illustrate a preferred embodiment of my invention:

FIG. 1 is a plan view of my improved knob assembly;
FIG. 2 is a section taken on the line 2—2 of FIG. 1;
FIG. 3 is a section taken on the line 3—3 of FIG. 2 showing the parts before being clamped to the shaft;
FIG. 4 is a section like FIG. 3 showing the relation of the parts after clamping;
FIG. 5 is a section taken on the line 5—5 of FIG. 3, but with the shaft removed; and
FIG. 6 is an end view of the clamp member per se.

Referring now to the invention as illustrated by the drawing, I have shown a shaft operating knob having a flanged body 1, provided with an axial bore 2 to receive a shaft 3. The knob body may be formed of any suitable material, but I prefer to make it of any suitable mouldable rigid plastic, rather than metal, because it will be easy and less expensive to manufacture. There have been many knob installations but mine is simple, has fewer parts and is easy to manufacture and assemble.

In this connection, I have provided the knob body 1 with a shaft gripping means having a rigid wall portion 4, at the bore 2, and flexible portions 5, all surrounding the bore. Around the flexible portions 5 I have provided a groove 6 into which is fitted a flexible clamp member 7. This clamp member 7 is of simple horse-shoe shape and preferably made of spring metal so that the rounded portions 8—8 may spring toward and away from each other. There is also assembled with the knob body 1 a set screw 9 threaded into a threaded hole 10 so that the clamp 7 may be operated to cause the shaft 3 to be gripped or released as will be described hereinafter. When the knob is placed on the shaft 3 (FIG. 2) it is only necessary to tighten the screw 9 to force the clamp 7 from the position shown in FIG. 3 to the position shown in FIG. 4. Thus the rounded portions 8—8 of the clamp 7 are forced toward each other, by a clamping wall 11 at the groove 6, against the flexible portions 5—5 and the flexible portions in turn are forced against the shaft 3. Thus the shaft 3 is tightly gripped between the rigid wall 4 and the flexible portions 5—5 as best shown in FIG. 4.

While I have illustrated and described a preferred embodiment of my invention, reference is made to the following claims wherein the invention is best defined:

I claim:

1. The combination with a shaft of a shaft operating knob, said knob having a shaft receiving bore and said knob having integral shaft gripping means surrounding said bore, said shaft gripping means including a fixed wall portion and at least two flexible portions presenting shaft engaging walls cooperating with the fixed wall and gripping the shaft, said knob having a groove adjacent to said flexible portions, a flexible clamp member located in said groove and a clamp operating means carried by said knob and operable against said clamp member to force said clamp member into pressing engagement with said flexible portions whereby said shaft is gripped tightly between the fixed wall and the shaft engaging walls of the flexible portions.

2. The combination with a shaft of a shaft operating knob, said knob having a shaft receiving bore and said knob having integral shaft gripping means surrounding said bore, said shaft gripping means including a fixed wall portion and at least two flexible portions presenting shaft engaging walls cooperating with the fixed wall and gripping said shaft, said knob having a groove adjacent to said flexible portions, a flexible clamp member located in said groove and a clamp operating means carried by said knob and operable against said clamp member to force said clamp member into pressing engagement with said flexible portions whereby said shaft is gripped tightly between the fixed wall and the shaft engaging walls of the flexible portions, the said flexible clamp member being substantially horseshoe shaped and the said knob presenting a clamping wall adjacent to the groove in the knob, said clamping wall contacting said clamp member being arcuately shaped so as to force said clamp member against said flexible portions of said shaft gripping means.

References Cited in the file of this patent

UNITED STATES PATENTS

| | | |
|---|---|---|
| 1,220,648 | Leader | Mar. 27, 1917 |
| 2,136,160 | Tinnerman | Nov. 8, 1938 |
| 2,306,876 | Gits | Dec. 29, 1942 |

FOREIGN PATENTS

| | | |
|---|---|---|
| 1,028,717 | France | Feb. 25, 1953 |
| 18,177 | Germany | May 26, 1882 |